July 26, 1960
C. C. CRAIG
2,946,271
FILM HOLDER
Filed Feb. 1, 1954
3 Sheets-Sheet 1
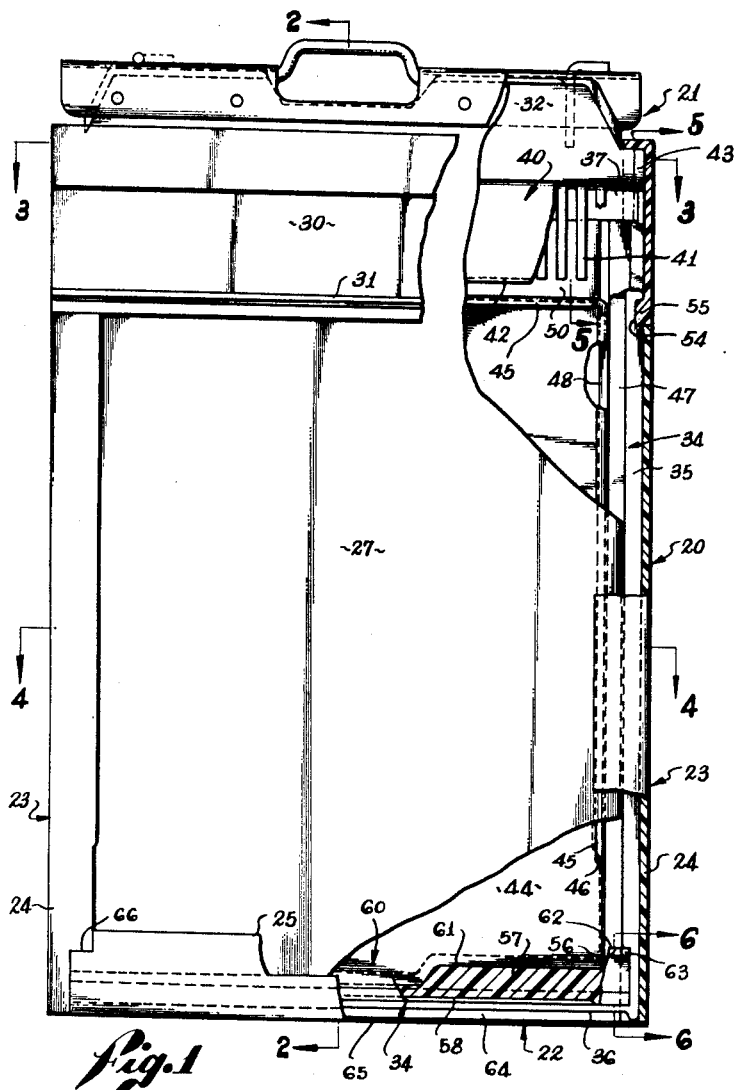
Fig. 1
Fig. 2
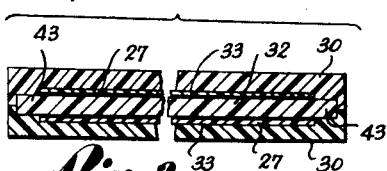
Fig. 3
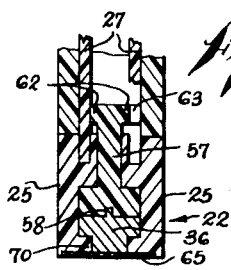
Fig. 6
Fig. 5
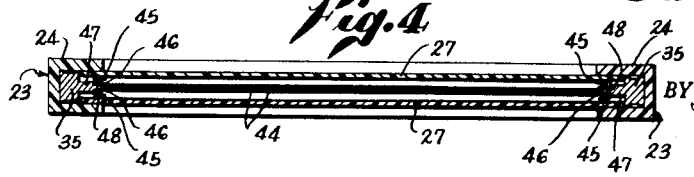
Fig. 4
INVENTOR.
CARROLL C. CRAIG
BY Fulwider Mattingly & Babcock
Attorneys July 26, 1960
C. C. CRAIG
2,946,271
FILM HOLDER
Filed Feb. 1, 1954
3 Sheets-Sheet 2
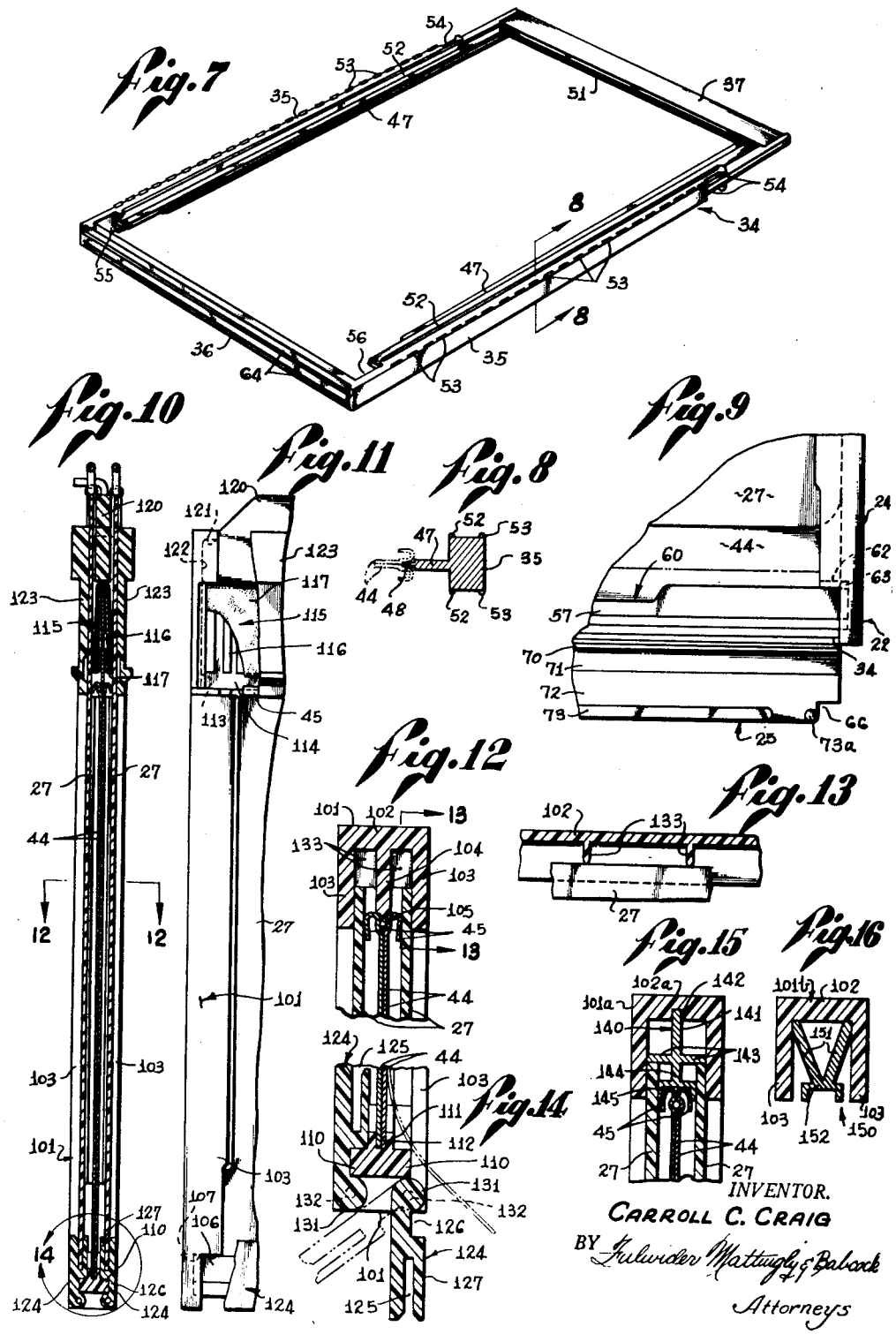
INVENTOR.
CARROLL C. CRAIG
BY Fulwider Mattingly & Babcock
Attorneys

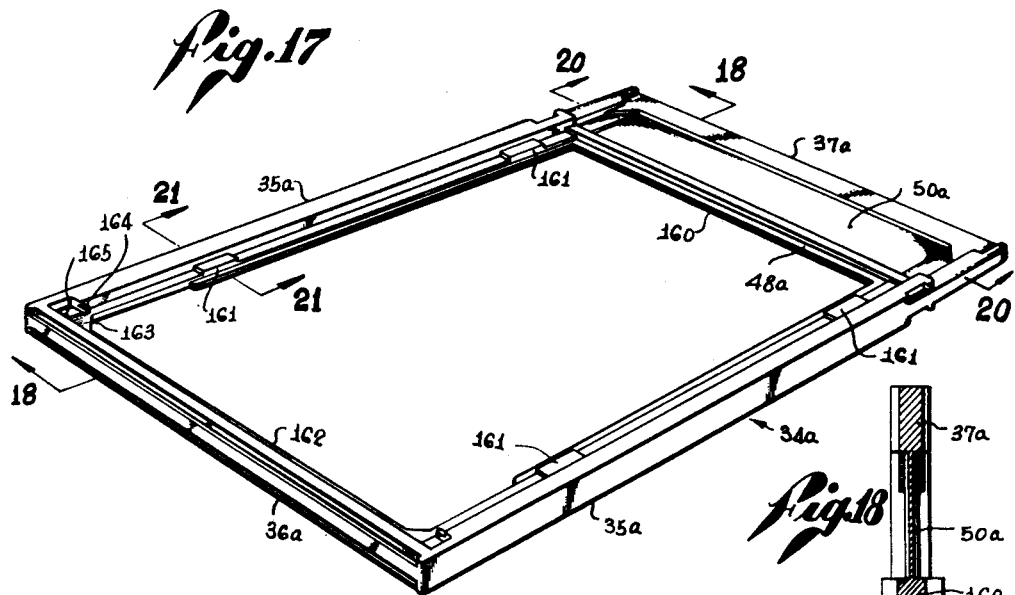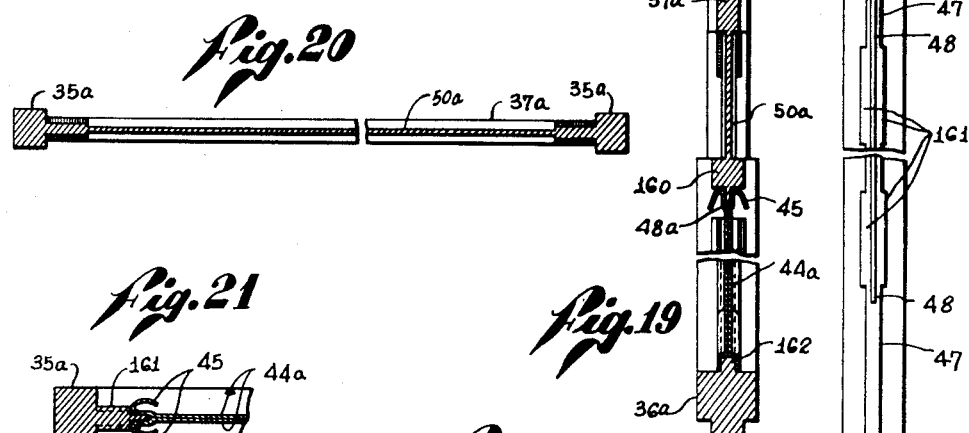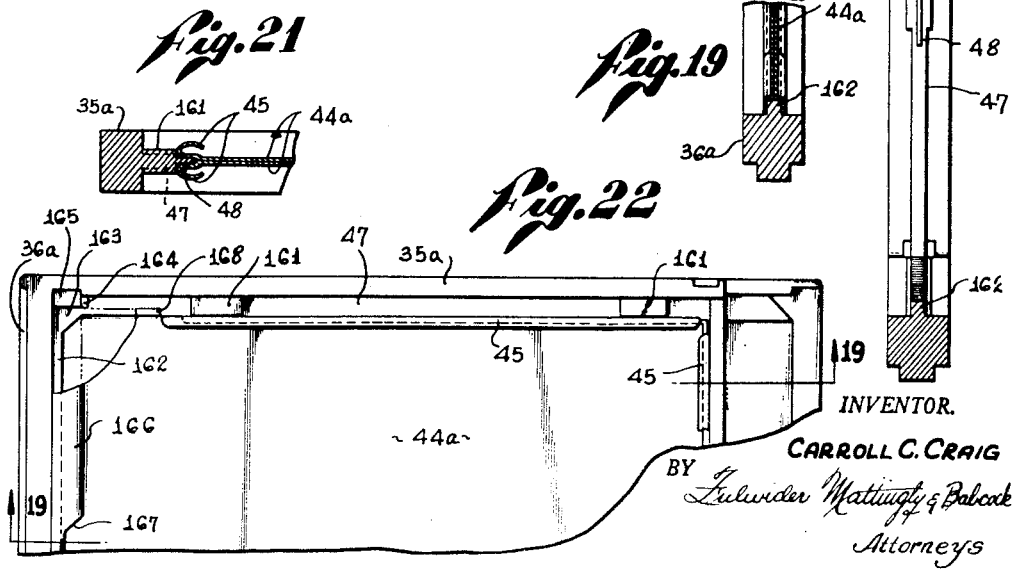

United States Patent Office 2,946,271
Patented July 26, 1960

2,946,271

FILM HOLDER

Carroll C. Craig, 635 Muirfield Road,
Los Angeles 5, Calif.

Filed Feb. 1, 1954, Ser. No. 407,222

7 Claims. (Cl. 95—66)

My invention relates generally to film holders, and more particularly to an improved film holder of a type adapted to receive cut film for use in a camera.

For many years, almost all cameras that do not use roll film have used a photosensitive material in the form of a plate or cut film that is mounted in a film holder which is removably held in the focal plane of the camera. Most of these holders have been of a form adapted to receive two plates or cut films, one on each side of a partition, and the individual films are protected from the light by means of removable dark slides. Heretofore, the film holders have usually been made of wood, such as cherry, since this material possesses considerable dimensional stability, is relatively hard but easily worked, and has permitted the manufacture of a relatively inexpensive, light tight holder.

However, as the cameras themselves have been more precisely and accurately made, and as other materials have become available, there has arisen a demand for a more precisely fabricated film holder that can be manufactured at a moderate cost. While wood forms a very satisfactory material in many respects, the mass production techniques available with certain other materials are not so readily adapted for use with wood, and as labor costs have increased, the cost of producing a wooden film holder has likewise increased.

It is therefore a major object of my invention to provide an improved film holder for photographic film.

Another object of my invention is to provide such a holder that may be formed of material other than wood, such as metal, plastics, etc., to thereby take advantage of the properties of these other materials.

It is a further object of my invention to provide a film holder that may be thinner and of a lighter weight than the previously available wooden holders, while still retaining the necessary strength and rigidity.

Still another object of my invention is to provide a film holder having novel and effective means for preventing the admission of unwanted light to the film.

It is a still further object of my invention to provide a film holder whose various components are designed and constructed for fabrication by modern mass production methods so that the individual parts may be inexpensively produced, and these parts assembled by an operator having comparatively little skill as compared with the operators of woodworking equipment.

These and other objects and advantages of my invention will become apparent from the following description of preferred and modified forms thereof, and from the drawings illustrating those forms in which:

Figure 1 is a front elevational view of one presently preferred form of holder, incorporating my invention;

Figure 2 is a longitudinally cross-sectional view taken on the line 2—2 of Figure 1;

Figure 3 is a cross-sectional view taken transversely across the top of the holder, on the line 3—3 of Figure 1;

Figure 4 is a transverse sectional view taken on the line 4—4 of Figure 1;

Figure 5 is a fragmentary view of a section of the upper end of the holder, taken on the line 5—5 of Figure 1;

Figure 6 is a fragmentary sectional view of the lower end of the holder, taken on the line 6—6 of Figure 1;

Figure 7 is a perspective view of one form of stiffening frame or member that may be used in my preferred form of holder;

Figure 8 is a cross-sectional view taken on the line 8—8 of Figure 7;

Figure 9 is a fragmentary view of the lower end of the holder with the dark slide partially removed, and with the corresponding flap folded back for loading and removal of the film;

Figure 10 is a longitudinal sectional view of a modified form of holder;

Figure 11 is a fragmentary front elevational view of the modified form of holder shown in Figure 10, partially broken away to show the internal construction;

Figure 12 is a cross-sectional view of one side of the holder shown in Figure 10, taken on the line 12—12 thereof;

Figure 13 is a fragmentary view of a section of the edge of the optional form of holder, taken on the line 13—13 of Figure 12;

Figure 14 is an enlarged fragmentary section of a lower end of the modified form of holder, showing the area included within the circle 14 in Figure 10;

Figure 15 is a cross-sectional view similar to Figure 12 showing an alternate form of construction;

Figure 16 is a view similar to Figure 15, and showing still another form of construction;

Figure 17 is a perspective view of another form of stiffening member or frame that is used in my preferred form of holder;

Figure 18 is a longitudinal sectional view of the stiffening frame shown in Figure 17, taken on the line 18—18 thereof;

Figure 19 is a longitudinal sectional view of the stiffening frame shown in Figure 17, with the septa in place, the view being taken on the line 19—19 of Figure 22;

Figure 20 is a transverse sectional view of the upper portion of the stiffening frame shown in Figure 17, taken on the line 20—20 thereof;

Figure 21 is a cross-sectional view of one side of the stiffening frame shown in Figure 17, taken on the line 21—21 thereof; and Figure 22 is a fragmentary view of the stiffening frame shown in Figure 17, with the film receiving septa shown in place and partially broken away.

Referring now to the drawings, and particularly to Figures 1 through 8 thereof, the numeral 20 indicates generally a film holder of one preferred form of construction having an upper end 21, a lower end 22, and sides 23. Along each side 23 there is a channel member 24 that extends from the lower end 22 of the holder 20 to a point near the upper end 21. Extending between the channels 24 across the lower end of the end 22 of the holder 20 are a pair of hinged flap members 25, one on each face of the holder, and the upper edge of each flap member is provided with a groove 26 to receive the lower end of a dark slide 27 that extends between the channel members 24 to cover the film.

Extending across the front and rear faces of the film holder 20 at the upper end 21 are a pair of lock rib plates 30 that extend from one channel member 24 to the other, and are adapted to retain the light seal hereinafter described. Across the lower edge of each lock rib plate 30 is a rib 31 adapted to engage and lock into a cooperating groove or recess in the camera to locate and retain the film holder 20 in the camera while the exposure is being made, and an upper transverse member 32 is mounted between the lock rib plates 30 and extends from side to side of the holder to form, with the lock rib plates, slots 33 through which the dark slides 27 may be introduced.

Within the channel members 24 and extending across the lower end 22 of the holder 20 and across the upper end thereof, adjacent the lower end of the upper transverse member 32, is a stiffening member 34, in the general form of a rectangular frame to provide extra strength and rigidity to the holder. The stiffening member 34, separated from the remainder of the holder 20, is shown in Figure 7 where the sides 35, the bottom 36, and the top 37, are clearly shown. The lower end of the upper transverse member 32 is adjacent the upper portion 37 of the stiffening member 34, and clamped between the two is a light sealing member 40 preferably comprising a comb-like member 41 formed of a resilient material, such as brass, and covered with a cloth 42 that closes the slots 33 when the dark slides 27 are removed, and bears against the dark slides when the latter are in the slots, to prevent the passage of light to the film. The inner faces of the sides 35 act to guide the dark slides 27 as the latter are inserted and removed from the holder 20.

As best indicated in Figures 1, 2, and 3, and 5, the lock rib plates 30 are substantially hollow, with the two members extending toward each other to butt together along the sides of the holder 20. Near the sides, the tops of the lock rib plates 30 also butt together to form pockets at the upper corners of the holder 20 into which outwardly projecting ears 43 on the upper transverse member 32 extend, thereby firmly holding and anchoring the upper transverse member.

Within the central opening of the stiffening member 34, I mount a pair of septum members 44 that are adapted to receive the cut film. The edges of each septum, along the top and sides thereof, are bent over to form channel-like portions 45 to receive and guide the film. Additionally, I prefer to form an additional bead 46 near the open side of each channel-like portion to bend the edges of the film outwardly, away from the plane of the septum 44, so that the normally flat film is slightly bent at its edges to insure that the photosensitive surface remains flat over the entire image plane.

Heretofore, it has been customary to separate the two septa or film-receiving members 44 by some suitable spacing means so that while the septa are mounted back-to-back, they are spaced from each other. Since one of the objects of the present invention is to provide as thin a film holder as is practical, and since the distance from the face of the holder to the photosensitive surface is fixed by the requirements of the camera, in order that the film will be in the exact focal plane, the principal opportunity for making the holder thinner is to remove the separating means between the septa.

To hold the septa 44 in the proper location within the stiffening member 34, I form inwardly projecting ribs 47 along the sides 35 of the member. These ribs 47 have inwardly projecting flanges 48 thereon that are adapted to enter between the edges of the septa 44, adjacent the channel-like portion 45, with the outer surface of the channel-like portion 45 bearing against the inner surface 47. The septa 44 are securely held to each other and to the rib 47 and flange 48 by means such as cementing, welding, etc.

Since the stiffening member 34 extends upwardly beyond the upper ends of the septa 44, to the upper end of the light seal 40, a spacer 50 is positioned between the upper ends of the septa and the lower edge of the top member 37 of stiffening member 34. Preferably, the spacer 50 is held to the upper ends of the septa 44 as by cement, as previously described, with the lower edge of the spacer entering between the channel portions 45, like the flanges 48, though it is not essential that the spacer enter between the channel portions. The upper end of the spacer 50 may be centrally located with respect to the upper member of the frame 37 by a small rib 51 projecting therefrom. Substantially no stress is applied to the upper end of the spacer 50 tending to remove it from the desired position within the stiffening member 34, and hence the use of cement to hold the spacer to the rib 51 is quite satisfactory.

To aid in securing and holding the channel members 24 to the sides 35 of the stiffening member 34, the front and rear faces of the sides are provided with longitudinally extending beads 52 and 53. The bead 53 is interrupted along its length, and consequently presents an appearance somewhat similar to a dashed line, and aids in providing a good gripping surface for the cement to adhere to. Usually the cement is applied to the inner surface of the web of each channel member 24, and when this member is placed on the side member 35 of the stiffening member 34, the cement is forced around the side member, passing between the interrupted beads 53, but being stopped by the continuous bead 52.

At the upper end of the stiffening member 34, just above the channel members 24, the side members 35 are provided with outwardly facing notches 54 adapted to receive correspondingly shaped lugs 55 formed in the lock rib plate 30. It will be appreciated that the lock rib plate 30 abuts the upper ends of the channel members 24 to make a light tight seal therebetween, and it is important that these members be securely held in proper relationship to each other. The notches 54 and lugs 55 also aid in securely holding the lock rib members 30 to the stiffening member 34, so that a strong and durable holder is provided, and the critical distance from the rib 31 to the bottom 22 of the holder is accurately maintained.

At the lower end of the stiffening member 34, the rib 47 and the flange 48 are omitted, and the inner side 35 of the frame is formed to provide recesses 56 for receiving a lower transverse member 57. The lower edge of the transverse member 57 is cemented to the bottom member 36 of the stiffening member 34, and as shown in Figures 1, 2, and 6, a rib 58 projects upwardly from the bottom member 36 to engage a corresponding groove in the transverse member to aid in locating and holding the latter as well as preventing the passage of light therebetween.

Adjacent the longitudinal center of the film holder 20, the upper edge of the lower transverse member 57 is notched to facilitate the insertion and removal of film in the septa 44, this notch being indicated generally by the numeral 60. Extending along the length of the transverse member 57 on the upper surface thereof is a groove 61 adapted to receive the lower ends of the septa 44. By cementing the lower edges of the septa 44 in the groove 61 of the lower transverse member 57, and in turn cementing that transverse member to the bottom member 36 of the stiffening member 34, the remaining edges of the septa are firmly held and connected to the frame.

As mentioned, the lower transverse member 57 extends into recesses 56 formed in the side member 35 of the stiffening member 34, and the transverse member thus projects laterally beyond the septa. The ends of the transverse member 57 extend upwardly, above the lower edges of the septa 44 so that the channel members 24 and the transverse member are additionally locked together in this manner. The portions of the ends of the transverse member 57 that bear against the sides of the septa are made thicker to provide lugs 62 that extend toward the face of the dark slide 27 at the edge thereof when the latter is in its fully inserted position. Laterally outwardly from the lug 62 are bosses 63 that bear against the end of the full section of the side members 35 of the stiffening member, these bosses acting, along with the lugs 62, to reduce the possibility of stray light reaching the film within the septum 44, in a manner hereinafter described. The bosses 63 bear thus against the side edges of the dark sides 27 when the latter are in their fully inserted position.

As is best seen in Figure 2, the lower edge of the lower transverse member 57 is thicker than the upper portion thereof, so that in general, the member has a generally T-shaped cross-section. The lower portion of the T, corresponding to the cross-bar thereof, has a thickness corresponding to the thickness of the bottom portion 36 of the stiffening member 34, so that the corresponding faces of the lower transverse member 57 and of the bottom member 36 are substantially coplanar. The bottom edge of the bottom member 36 has a transversely extending notch or groove 64, a transverse ridge in the bottom member 36, extending from one side channel member 24 to the other.

The flaps 25 are hingedly connected to the bottom member 36 of the stiffening member 34 by suitable means, such as by a cloth strip 65 that is glued or cemented to the lower surface of the bottom member 36, and to the lower edges of the flaps 25. Preferably, the lower surfaces of the flap 25 have slight ridges formed along their forward edges so that the cloth strip 65 is located in a "trough" formed by these ridges, as seen in Figure 6. Also, the thickness of the lower edge of each flap 25 is preferably equal to the lowermost edge of the frame 36. As seen in Figure 1, the flaps 25 extend between the side channels 24, and are notched at their upper corners 66 to provide a stepped joint between the channel member and the flap. The dark slide normally extends below the lower edge of the notch 66, and consequently the possibility of stray light entering the holder and fogging the film is reduced.

To further reduce the possibility of light leakage, the flaps 25 are formed with grooves and ridges that extend transversely across the holder, providing a labyrinth seal against the admission of light from the lower edge of the holder. As best seen in Figures 2 and 6, the lowermost edge of the flap 25 is comparatively thick, to fit within the transversely extending grooves 64 formed in the bottom member 36 of the stiffening member 34. The body of the flap 25 is then made thinner, to receive the body of the bottom member 36 and the thicker portion of the lower transverse member 57, and above this portion, the flap 25 is again made thicker to bear against the major portion of the lower transverse member 57. Finally, along the upper edge of the flap 25 there is a ridge that bears against the film itself, this portion extending beyond the upper edge of the lower transverse member 57 and acting as an additional step to prevent any leakage of light. Thus, as seen in Figures 2, 6, and 9, the lowermost edge of the flap 25 is provided with a ridge 70 that fits into the groove 64, a groove 71 is located above the ridge 70 to receive the body of the bottom member 36 of the stiffening member 34 and the thicker portion of the lower transverse member 57, while a thicker or body portion 72 of the flap bears against the thinner portion of the lower transverse member 57. Finally, the ridge 73 bears against the film within the septum 44 to hold the lower edge of the film flat, and further insure against leakage of light to the film.

To prevent light from leaking around the corners of the flaps 25, the corners are provided with notches 66 as heretofore described, and the lower transverse member 57 is provided with a lug 62 extending above the lower edge of the notch, and projecting forwardly, away from the plane of the septum 44 to prevent any light that may have gotten through the notch 66 from passing upwardly to the film. The ridge 73, or an extension 73a thereof, shown in Figure 9, prevents any light that has gotten through the notch 66 from passing transversely inwardly to the film.

Finally, to prevent light that may have gotten through the notch 66 from passing transversely outwardly, then upwardly and then to the film, the boss 63 projects forwardly, away from the plane of the septum 44, and beyond the plane of the lug 62 to prevent light from following up the groove receiving the dark slide 27.

With the construction thus described, it will be realized that the possibility of light leaking around the flap 25 to the film within the septa 44 is reduced to a minimum. The construction is such that the flaps 25 may be molded of a plastic, as may the lower transverse member 57 and the channel members 24 forming the sides of the holder 20. Such a construction permits of rapid and economical fabrication of rugged and accurate holders.

Furthermore, it will be noted that by using this form of construction, no separate grooves are required for the dark slides 27, since these are movable within the channel members 24, between the legs of the channel members and the channel-like portions 45 of the septa 44. The septa 44 in turn are firmly attached to each other and to the stiffening frame 44 so that warpage, twisting, and other distortion of the film holder is reduced to a minimum. While various materials may be used for the different components, I have found it very satisfactory to form the septa 44 of sheet aluminum alloy, while the stiffening member 34 may be of die cast aluminum. The spacer 50, between the septa 44 and the upper end of the frame 44 may likewise be of sheet aluminum alloy, while the comb-like member 41 of the light seal may, as previously indicated, be of brass.

The various plastic members may very satisfactorily be formed of a high impact strength plastic that is capable of being injection or compression molded, and some of the modified polystyrene compounds are quite satisfactory. Such a compound should be one having dimensional stability, a minimum of moisture absorption, be heat and chemically resistant, and have high impact and flexural strength. Finally, the dark slides 26 may very well be formed of a laminated phenolic compound of well known type. The plastic itself is preferably black or some suitable color that does not reflect or transmit light, and the various metal parts are likewise preferably blackened.

*Modified form*

In some instances, it is not desirable to make use of the stiffening member 34, and in Figures 10 through 16, I have illustrated alternate forms of construction in which this member is omitted. In this form, I make use of a pair of channel-like side members 101 that extend from the lower end of the film holder substantially to the upper end thereof. Each channel member 101 includes a web 102 and a pair of legs 103, and preferably integrally molded with the channel member is a central web 104. At its free edge, the central web 104 is reduced in thickness to provide a rib 105 that is inserted between a pair of septa 44 in the same manner that the flange 48 of the preferred form is inserted between the edges of similar septa 44.

As in the previously described form, the septa 44 are cemented to each other, back-to-back, and to the rib 105. Channel-like portions 45 on the edge of the septa receive the film, and these are spaced from the legs 103 of the channel members 101 to provide a space through which dark slide 27 may be slid.

At the lower end of the channel members 101, I provide a lower transverse member 106 that extends across the film holder from side-to-side, and whose ends are located in pockets 107 formed in the channel members. The lower portion of the transverse member 106 is comparatively thick, corresponding to the thickness of the lower portion of the lower transverse member 57 previously described, and the upper portion is made thinner, in a manner similar to the upper portion of the transverse member 57. The thicker portion of the lower transverse member may be considered equivalent to a ridge 110 and the thinner portion may be considered the equivalent of a groove 111. Centrally located along the upper edge of the lower transverse member 106 is a slot 112 adapted to receive the lower edges of the septa 44, the latter being cemented in the lower transverse member, and that member being cemented in the pockets 107 in the channel members 101.

At the upper end of the channel members 101 above the upper edge of the septa 44, the width of the channel members is reduced, as is their thickness. A centrally located vertically extending slot 113 is formed in the channel members 101 to receive a spacer 114 that extends transversely across the holder above the septa 44, the lower edge of the spacer being fitted between the edges of the septa 44, in the manner that the spacer 50, previously described, fits between the septa 44 in the preferred form. A light sealing member 115 is supported by the upper edge of the spacer 114, the sealing member consisting preferably of a comb-like member 116 covered with a suitable material such as fabric 117.

Above the light sealing member 115 is an upper transverse member 120 generally similar to the upper transverse member 32 previously described, but having lugs 121 on the lateral ends thereof that fit into pockets 122 formed in the channel members 101. Lock rib plates 123 extend transversely across the upper end of the holder, and, while spaced from the upper transverse member 120, are cemented to the channel members 101.

To close the lower end of the holder, flaps 124 are hingedly mounted at the lower end of the channel members 101, the flaps being generally similar to the flaps 25 previously described. Thus, along the upper edge of each flap 124, there is a slot 125 adapted to receive the dark slide 27, and each flap has a transversely extending recess 126 formed therein to nest with the corresponding ridge 110 of the lower transverse member 106. Similarly, a thicker portion or ridge 127 fits into the thinner portion or groove 111 of the lower transverse member, thereby providing a very simple and effective light seal.

The lower edges of the flaps 124, instead of being generally rectangular, like the corresponding edges of flaps 25 previously described, are instead rounded, as best shown in Figure 14 to produce a generally cylindrical surface 131. As seen in that figure, it will be noted that the lower ends of the channel members 101 extend a short distance below the bottom of the lower transverse member 106, and the flaps 124 are pinned to the lower end of the channel members for rotation about the axis of the cylindrical surface 131. The pins 132 are indicated in dotted outline in Figure 14, and the pins may either be formed in the flaps themselves, in which case they will be received in corresponding holes formed in the ends of the channel members 101, or the pins may be carried by the channel members and received in holes in the flaps. Such a construction has the advantage that it permits the flaps to be swung farther open, as indicated in the phantom line position in Figure 14, thereby facilitating insertion and removal of the film in the septa 44.

As indicated in Figure 12, the dark slides 27 are somewhat narrower than the overall distance between the interior of the web 102 on one side of the film holder and the corresponding surface on the opposite side thereof. Using the somewhat narrower dark slides 27 makes it possible to provide a light sealing member 115 of simple and very effective construction, whereas the use of a wider slide would require a more complicated construction. However, in order that the slide may be more properly and smoothly guided in its passage along the channels 101, and also to prevent any possibility of light leak along the edges of the slides, I provide periodically spaced ribs 133 that extend from the center web 104 to the corresponding leg 103 and guide the slide 27 in the manner indicated in Figure 13. As a result, the slide is easily inserted and removed, and light is effectively prevented from travelling along the length of the channel member 101.

This optional form of my device has the advantage that it is preferably formed substantially entirely of plastic, and cost and weight may both be kept to a minimum. The labor required to assemble such a film holder is somewhat less, but it will be appreciated that this optional form requires a material having somewhat greater rigidity and resistance to bending than is required of the plastic used in my preferred form.

As an intermediate form of holder, I have illustrated in Figures 15 and 16 how a film holder may be built that has somewhat greater strength than my optional form, but still without the use of a reinforcing and stiffening frame 34. As shown in Figure 15, a channel member 101a is provided that has a web 102a and legs 103, as in the case of the channel member 101 previously described, but the central web 104 is omitted. In its place, I mount a metal section 140 that may be an extrusion, having a general cruciform shape surmounting a channel section. One arm 141 of the cross-shaped section is fitted within a groove 142 formed in the web 102a while the two adjacent arms 143 of the cross bear against the inner walls of the legs 103 of the channel 101a. The remaining arm 144 carries a channel section 145 adapted to receive the channel sections 45 of the septa 44. The dark slides 27, in this form, thus slide between the edges of the channel section 145 and the adjacent edges of the legs 103 of the channel section 101a. It will be appreciated, of course, that by omitting the channel section 145 and continuing the arm 144, it may be fitted between the edges of the septa 44, in a manner similar to that illustrated in Figure 12.

In Figure 16, I have illustrated still another method of accomplishing the same general results. In this case, the channel member 101b has a web 102 with legs 103 extending therefrom, and a metal section 150 is placed within the channel so formed. The metal section 150 has a pair of diverging legs 151 that extend into the corners of the channel 101b and converge at the center of a channel section 152 adapted to receive the septa 44 and channel sections 45 thereof, as illustrated in Figure 11. Here again, it will be apparent that if the channel section 152 is omitted, a centrally located rib, similar to the rib 105 of the previously described form may be inserted between the channel sections 45 of septa 44.

In each instance, the metal section that supports the septa is, of course, cemented to the corresponding channel member, so that a strong and rigid construction is provided. In many respects, the forms of construction illustrated in Figures 15 and 16 produce a holder very similar to the form shown in Figures 10 through 14. However, the use of the metal sections stiffens and strengthens the film holder so that certain plastic, which may be unsuitable for use with the form shown in Figures 10 through 14, may very properly be used to form a holder making use of the metal section.

In Figures 17 to 22, I have shown another form of stiffening member that may be used in the preferred form of film holder indicated generally in Figures 1 through 9. As will become apparent, the general construction of the holder is similar to that previously described, with a few modifications made in the stiffening member and slight modifications made in the septa that fit into it.

To simplify the fabrication and assembly of the complete film holder, the stiffening member 34a shown in Figure 17 is designed so that the spacer 50, used with the form of stiffening member shown in Figure 7, is made an integral portion of the complete stiffening member. Thus, the stiffening member 34a has sides 35a, a bottom 36a, and a top 37a. In addition, a cross-bar 160 extends between the sides 35a near the upper end of the stiffening member 34a, in a position with its lower edge substantially aligned with the lower edge of the spacer 50 of the previously described frame. Between the cross-bar 160 and the top 37a of the stiffening member, I provide an integral spacer 50a that completely fills the space between the cross-bar and the top, and extends between the side members 35a so that no passage of light between opposite faces of the stiffening member is possible through the area above the cross-bar. It will be recognized that this construction simplifies the asembly of the completed film holder, since it is not necessary to insert the spacer 50 in the stiffening member 34 and then cement the spacer in place.

The side members 35a are generally similar to the side members 35, previously described, but to aid in locating and retaining the septa in the desired position, I provide locating pads or bosses 161 that extend forwardly from the ribs 47 to engage the edges of the septa 44a, as indicated in Figure 21. While the bosses 161 have been illustrated as being generally rectangular, it is clear that they may very well be circular, or, if desired, may be expanded until they form a continuous abutment extending along the length of the sides 35a. In addition, of course, between the bosses 161, the sides 35a are provided with the ribs 47 as previously described, with the flanges 48 projecting from the ribs to enter between the septa 44a. In addition, the lower edge of the cross-bar 160 is provided with a similar flange 48a to enter between the septa 44a at the upper edges thereof. Alternatively, the cross-bar 160 may be made thinner and provided with bosses, similar to the side members 35a.

The lower end of the stiffening member 34a is slightly modified from the lower end of the stiffening member 34 previously described, and this permits the elimination of the lower transverse member 57. Thus, the upper portion of the end 36a is provided with a rib 162 that extends from one side member 35a to the other, and is adapted to fit between the septa 44a. The rib 162 is relatively thin, and does not extend to a point substantially aligned with the lower edge of the film that is to be placed within the septa 44a, but instead stops considerably short of that edge. At the ends of the rib, adjacent the sides 35a, the rib is preferably formed at an angle to form a corner reinforcement 163, as best seen in Figure 22. At the upper end of the corner reinforcement 163 is a forwardly projecting boss 164 similar to the lug 62 of the previously described lower transverse member 57.

As previously mentioned, the rib 162 is relatively thin, and, as indicated in Figure 18, is preferably the approximate thickness of the rib 47 extending along the sides 35a. Outwardly from the corner reinforcement 163, the rib 162 is thickened slightly by an amount approximately equal to twice the thickness of the sheet material forming the septa 44a so that, as hereinafter described, a smooth surface is provided when the septa are in place. This thickened portion 165 extends from the upper surface of the bottom member 36a to the lug 62, thereby completing and filling in the corner of the lower end of the frame 34a.

The septa 44a are quite similar to the septa 44 previously described, with the exception that at their lower ends the septa are flanged to engage the rib 162. In addition, the sides of the septa 44a are similarly flanged at the lower ends so that they fit over and engage the opposite faces of the rib 47, below the channel-like portions 45. Thus, the sides of the septa 44a, at the lower ends thereof, are bent forwardly and then outwardly to provide an offset portion, and the bottoms of the septa are similarly formed, as best indicated in Figures 19 and 22. The portions of the offset that are parallel to the major plane of the septa 44 engage the forward and rearward surfaces of the ribs 47 and 162, thereby securely anchoring the septa in place.

With this construction, the septa 44a are slightly longer than the film they are intended to receive, and to properly locate the film within the septa, the offset portion along the bottom edge of the septa is spaced upwardly from the upper edge of the rib 162. The film is thus located and is retained in the depression produced by the offset forming the lower flange 166, and a space is left between the offset and the upper edge of the rib 162 along the major portion of the rib. However, in the center of the bottom of the stiffening member 34a, the offset portion is directed downwardly toward the upper surface of the rib 162 to form a recess 167 in which the fingernail may be placed to aid in the insertion and removal of the film within the septa 44a. Figure 19, which is a section through this portion of the septa 44 and stiffening member 34a, clearly show how the perpendicular portion of the offset bears against the upper surface of the rib 162, while the flanges 167 engage the opposite surfaces thereof.

In a similar manner, the sides of the septa 44a are provided with flanges 168 that engage the surfaces of the rib 47, and the lower edges of the flanges are adjacent the thickened portion 165 of rib 162 so that the septa are properly held at all times.

Thus, it will be seen that the septa 44a are firmly held against movement within the stiffening member 34a by reason of the enlarged cross-member 160 at the upper end of the septa, which bears against the channel-like portions 45 of the septa, as do the bosses 161 along the sides 35a, all cooperating with the rib 162 and the offset portions 166 along the lower edge of the septa. In this manner, a very rugged and durable film holder is provided in which assembly costs can be reduced to a minimum.

It will be appreciated, of course, that the side members 35a may be provided with the continuous and interrupted beads 52 and 53 of the previously described frame. The light seal 40 is installed as previously disclosed, and in other respects the assembly of a film holder using the frame 34a follows the pattern heretofore set forth.

From the foregoing, it will be seen that I have provided an improved film holder fully capable of securing the advantages and achieving the objects heretofore set forth. While I have shown and described preferred and optional forms thereof, it will be apparent that modifications may be made therein, and certain features of one form may be combined with other features of a different form. For example, instead of forming the stiffening member 34 with flanges 48 that enter between the septa 27, the frame may be provided with channel sections that engage the edges of the septa, as indicated in Figures 15 and 16. Consequently, I do not wish to be restricted to the particular form or arrangement of parts herein described and shown, except as limited by my claims.

I claim:

1. A film holder of the class described which includes: a pair of generally channel-shaped spaced side members; a lower transverse member between said side members; an upper transverse member; a resilient light seal adjacent the lower edge of said upper transverse member; a pair of film-receiving septa each having a smooth rear surface, said septa being mounted back-to-back with their rear surfaces abutting and held together over their entire area except at the edges, said pair of septa forming a single integral unit; a tongue centrally located with respect to said side members and connected to said members; said tongue extending toward said septa only and entering between said septa at the side edges thereof to support the same; means extending from said light seal toward said septa and adapted to engage only the upper edges thereof to support the same; a pair of hinged flaps extending between the lower ends of said side members and interfitting therebetween, each of said flaps having a transverse groove adapted to receive a cooperating ridge of said lower transverse member, and having a transverse ridge at the upper end of said flap adapted to bear directly upon the lower edge of any film which may be in the corresponding septum; a pair of lock rib plates extending from one side member to the other and covering said resilient light seal; and a pair of slides each adapted to be inserted past said light seal and to slide in said side members, with the lower edge of each slide being receivable in the upper portion of the corresponding one of said flaps.

2. A film holder of the class described which includes: a pair of generally channel-shaped spaced side members; a lower transverse member between said side members, having a groove across its upper surface; an upper transverse member; a resilient light seal adjacent the lower edge of said upper transverse member; a pair of film-receiving septa each having a smooth rear surface, said septa being mounted back-to-back with their rear surfaces abutting and held together over their entire area except at the edges to form a single integral unit having a groove along its edges; a stiffening member inserted in the channel opening of each of said side members and having a tongue centrally located with respect to said side members and extending toward said septa and entering between said septa into said groove at the side edges thereof to support the same; a spacer extending from said light seal toward said septa into said groove and entering between said septa at the upper edge thereof to support the same, the lower edges of said septa being received and held in said groove in said lower transverse member; a pair of hinged flaps extending between the lower ends of said side members and interfitting therebetween, each of said flaps having a transverse groove adapted to receive a cooperating rigde of said lower transverse member, and having a transverse ridge at the upper end of said flap adapted to bear directly upon the lower edge of any film which may be in the corresponding septum; a pair of lock rib plates extending from one side member to the other and covering said resilient light seal; and a pair of slides each adapted to be inserted past said light seal and to slide in said side members, with the lower edge of each slide being receivable in the upper portion of the corresponding one of said flaps.

3. A film holder of the class described which includes: a pair of generally channel-shaped spaced side members; a stiffening member having top, bottom, and side portions, said side portions being shaped to fit within the channel opening of said side members to stiffen said members; a lower transverse member at the bottom portion of said stiffening member, extending between said side portions thereof, and having a groove across its upper surface; a generally U-shaped light seal mounted on the upper surface of said top portion of said stiffening member and extending toward said bottom portion of said stiffening member on both faces thereof; a pair of film-receiving septa each having a smooth rear surface, said septa being mounted back-to-back with their rear surfaces abutting and held together over their entire area except at the edges, forming a single integral unit having a groove along its edges; an inwardly extending tongue on each of said side portions of said stiffening member adapted to engage and hold the side edges of said septa by entering into said groove along the edges of said integral unit; a spacer extending from the lower surface of said top portion of said stiffening member toward said septa, the lower edge of said spacer engaging said groove along the upper edge of said integral unit to support said septa, the lower edges of said septa being received and held in said groove in said lower transverse member; a pair of hinged flaps extending between the lower ends of said side members and interfitting therebetween, said flaps having ridges and grooves therein to conform to the adjacent surfaces of said lower transverse member and the bottom portion of said stiffening member; a pair of lock rib plates extending from one side member to the other and covering said resilient light seal; and, a pair of slides each adapted to be inserted past said light seal and to slide in said side members, with the lower edge of each slide being receivable in the upper portion of the corresponding one of said flaps.

4. A film holder of the class described which includes: a pair of generally channel-shaped spaced side members; a stiffening member having top, bottom, and side portions, said side portions being shaped to fit within the channel opening of said side members to stiffen the same, and projecting above said side members, with notches formed in said projecting sections; a generally U-shaped light seal mounted on the upper surface of said top portion of said stiffening member and extending toward said bottom portion thereof; a pair of film-receiving septa mounted back-to-back and supported by said stiffening member; an upper transverse member above said light seal extending from one side of said stiffening member to the other; and a pair of lock rib plates extending transversely above said side members and covering said light seal and a portion of said upper transverse member, said plates having lugs adapted to fit into said notches in said stiffening member, and having pocket portions at their upper ends to receive the ends of said upper transverse members, whereby the elements of said film holder are accurately located with respect to each other and firmly held.

5. A film holder of the class described which includes: a pair of spaced side members of a generally channel-shaped cross-section; a stiffening member having top bottom, and side portions, said side portions being shaped to fit within the channel opening of said side members to stiffen the same, and projecting above said side members, with notches formed in said projecting section, the bottom portion of said stiffening member having a transversely extending rib on its upper surface, the side portions of said stiffening member adjacent said bottom portion being recessed on the inner surface thereof; a lower transverse member at the bottom portion of said stiffening member, the ends of said transverse member fitting into said recesses of said stiffening member, said transverse member having a groove in its lower surface adapted to align with and fit said rib; a generally U-shaped light seal mounted on the upper surface of said top portion of said stiffening member and extending toward said bottom portion thereof; a pair of film-receiving septa mounted back to-back and supported by said stiffening member; an upper transverse member above said light seal extending from one side of said stiffening member to the other; and, a pair of lock-rib plates extending transversely above said side members and covering said light seal and a portion of said upper transverse member, said plates having lugs adapted to fit into said notches in said stiffening member, and having pocket portions at their upper ends to receive the ends of said upper transverse members, whereby the elements of said film holder are accurately located with respect to each other and firmly held.

6. A film holder of the class described which includes: a pair of spaced side members each having a generally channel-shaped cross-section; a stiffening member having top, bottom, and side portions, said side portions being shaped to fit within the channel opening of said side members to stiffen the same, and projecting above said side members, with notches formed in said projecting section, said side portions having centrally located septa-receiving sections extending along said side portions, the bottom portion of said stiffening member having a transversely extending rib on its upper surface; a generally U-shaped light seal mounted on the upper surface of said top portion of said stiffening member and extending toward said bottom portion thereof; a pair of film-receiving septa each having a smooth rear surface, said septa being mounted back-to-back with their rear surfaces abutting and held together over their entire area except at the edges, forming a single integral unit having a groove along its edges, said septa-receiving sections entering said groove to support said septa; an upper transverse member above said light seal extending from one side of said frame to the other; means extending from the lower surface of said top portion of said stiffening member toward said septa, the lower edge of said means engaging said groove along the upper edge of said integral unit to support said septa, the lower edges of said septa being engaged and held by said rib on said bottom portion of said stiffening member; a pair of lock rib plates extending transversely above said side members and covering said light seal and a portion of said upper transverse member, said plates having lugs adapted to fit into said notches in said stiffening member, and having pocket portions at their upper ends to receive the ends of said upper transverse member, whereby the elements of said film holder are accurately located with respect to each other and firmly held; a pair of hinged flaps extending between the lower ends of said side members and interfitting therebetween, said flaps having ridges and grooves therein to conform to the adjacent surfaces of said bottom portion of said stiffening member; and a pair of slides each adapted to be inserted past said light seal and to slide in said side members, with the lower edge of each slide being receivable in the upper portion of the corresponding one of said flaps.

7. A film holder of the class described which includes: spaced side members having inwardly facing notches at their lower ends; a lower transverse member between said side members, substantially aligned with said notches in said side members, and having transversely extending grooves and ridges; an upper transverse member; a pair of film-receiving septa mounted back-to-back and held within the space bounded by said side and transverse members, said side members thereby having longitudinally extending grooves formed in their inner faces extending from said upper transverse member to said lower transverse member; slides movable in said grooves in said side members, across the faces of said septa to cover any film therein and protect it from light; a flap on each face of said film holder at the lower edge thereof and hingedly attached thereto, said flaps extending from one of said side members to the other, having notches in their upper corners that cooperate with said notches in said side members to form stepped joints, each of said flaps having a groove extending transversely across its upper surface to receive the corresponding one of said slides, the inner faces of said flaps having transverse ridges and grooves adapted to interfit with corresponding transverse grooves and ridges on said lower transverse member; a transversely extending ridge on the inner face of each of said flaps adjacent the upper edge thereof and located above said lower transverse member when said flap is closed, whereby said ridge is adapted to bear against the lower edge of any film within the adjacent septum; and, a light baffle in said holder at the junction of said lower transverse member with said side members, said baffle comprising a raised portion projecting forwardly, toward the face of said holder, from the surface of said lower transverse member, said raised portion being located above the lower edge of said notch formed in flaps, and rearwardly from the normal position of said slide with an additional boss projecting to the adjacent surface of said side member to close the portion of said groove in said side member outwardly from said slide, thereby preventing the admission of stray light.

References Cited in the file of this patent

UNITED STATES PATENTS

| | | |
|---|---|---|
| 2,203,912 | Levin | June 11, 1940 |
| 2,339,658 | Smith | Jan. 18, 1944 |
| 2,410,919 | Aiken | Nov. 12, 1946 |
| 2,450,841 | Moore | Oct. 5, 1948 |
| 2,462,713 | Bilofsky | Feb. 22, 1949 |
| 2,598,911 | Helberg | June 3, 1952 |

UNITED STATES PATENT OFFICE
CERTIFICATE OF CORRECTION

Patent No. 2,946,271  July 26, 1960

Carroll C. Craig

It is hereby certified that error appears in the above numbered patent requiring correction and that the said Letters Patent should read as corrected below.

Column 10, line 57, strike out "only" and insert the same after "septa" in line 58, same column.

Signed and sealed this 12th day of December 1961.

(SEAL)
Attest:

ERNEST W. SWIDER
Attesting Officer

DAVID L. LADD
Commissioner of Patents

USCOMM-DC